US010669850B2

(12) United States Patent
Blackwell

(10) Patent No.: US 10,669,850 B2
(45) Date of Patent: Jun. 2, 2020

(54) IMPELLER-TYPE LIQUID RING COMPRESSOR

(71) Applicant: Brian Blackwell, Bixby, OK (US)

(72) Inventor: Brian Blackwell, Bixby, OK (US)

(*) Notice: Subject to any disclaimer, the term of this patent is extended or adjusted under 35 U.S.C. 154(b) by 277 days.

(21) Appl. No.: 15/722,402

(22) Filed: Oct. 2, 2017

(65) Prior Publication Data

US 2018/0179894 A1    Jun. 28, 2018

Related U.S. Application Data

(60) Provisional application No. 62/437,758, filed on Dec. 22, 2016.

(51) Int. Cl.
*F01C 21/02* (2006.01)
*F04C 19/00* (2006.01)
(Continued)

(52) U.S. Cl.
CPC .............. *F01C 21/02* (2013.01); *F04C 19/00* (2013.01); *F04C 19/001* (2013.01); *F04C 28/06* (2013.01); *F16C 35/06* (2013.01); *F04C 2240/30* (2013.01); *F04C 2240/50* (2013.01); *F04C 2240/51* (2013.01); *F16C 19/546* (2013.01);
(Continued)

(58) Field of Classification Search
CPC ...... F04B 19/00; F04B 19/001; F04B 19/002; F04B 19/004; F04B 19/005; F04C 19/00; F04C 19/001; F04C 19/002; F04C 19/004; F04C 19/005
See application file for complete search history.

(56) References Cited

U.S. PATENT DOCUMENTS 4,637,780 A    1/1987  Grayden
5,100,300 A *  3/1992  Haavik ................ F04C 19/008
                                        417/68
(Continued)

FOREIGN PATENT DOCUMENTS

EP        0945621 A1    9/1999
KR      20160098691 A    8/2016
WO     2004/007969 A1    1/2004

OTHER PUBLICATIONS

International Search Report and Written Opinion dated Feb. 27, 2018, in connection with corresponding International Application No. PCT/US2017/061528 filed Nov. 14, 2017 (12 pgs.).

Primary Examiner — Patrick Hamo
(74) Attorney, Agent, or Firm — Maier & Maier, PLLC

(57) ABSTRACT

An impeller-type liquid ring compressor having a particular bearing configuration. Such a bearing arrangement may completely support the impeller as it rotates, eliminating many of the problems inherent in the prior art designs without changing the general overhung impeller design. This may allow the impeller-type liquid ring compressor to be easily retrofitted in existing use environments, such as, for example, oil and gas processing facilities, oil refineries, and petrochemical processing facilities. In some exemplary embodiments, a thrust bearing may be located on the front face of the impeller, or radial bearings may be disposed between the vanes of the impeller. A radial bearing and thrust bearing may further be disposed on the shaft side of the impeller close to the impeller itself. The compressor may be configured so that the process fluid carries heat away from each of these bearings.

14 Claims, 4 Drawing Sheets

(51) Int. Cl.
  *F16C 35/06* (2006.01)
  *F04C 28/06* (2006.01)
  F16C 21/00 (2006.01)
  F16C 19/54 (2006.01)
  F16C 35/00 (2006.01)

(52) U.S. Cl.
  CPC .............. *F16C 21/00* (2013.01); *F16C 35/00* (2013.01); *F16C 2360/44* (2013.01)

(56) References Cited

U.S. PATENT DOCUMENTS

| | | | |
|---|---|---|---|
| 5,122,035 A | 6/1992 | Juhola | |
| 6,296,441 B1 | 10/2001 | Gozdawa | |
| 8,512,012 B2 * | 8/2013 | Akdis | F04D 29/047 |
| | | | 415/900 |
| 8,814,434 B1 * | 8/2014 | Sexton | F16C 33/043 |
| | | | 384/282 |
| 9,541,086 B2 * | 1/2017 | Beers | F04C 19/005 |
| 2005/0271520 A1 | 12/2005 | Karoliussen | |
| 2009/0265038 A1 | 10/2009 | Ramsey et al. | |
| 2011/0206548 A1 | 8/2011 | Doepker | |
| 2014/0050575 A1 | 2/2014 | Kim | |

* cited by examiner

IMPELLER-TYPE LIQUID RING COMPRESSOR

CROSS-REFERENCE TO RELATED APPLICATIONS

This application claims priority to U.S. Provisional Application No. 62/437,758, filed Dec. 22, 2016, the contents of which is herein incorporated by reference.

BACKGROUND

Centrifugal pump systems have been implemented for use in a wide variety of applications. Existing centrifugal pump systems typically make use of an overhung impeller. In a typical centrifugal pump system, fluid enters the impeller through the "eye" of the impeller, and is then "centrifuged" to the impeller periphery by the continuous rotation of the impeller, generally with assistance from the impeller vanes. In some designs, impellers can be open or closed, and may have one vane, many vanes, or no vanes at all.

One specific variant of the centrifugal pump system is the liquid-ring pump. Liquid-ring pumps are most commonly used as vacuum pumps or gas compressors. In a liquid-ring pump, liquid (typically water) is fed into the pump, and is formed into a moving cylindrical ring around the inside of the casing by the action of a multi-vane impeller. This liquid ring creates a series of seals in the spaces between the impeller vanes, which form compression chambers. The multi-vane impeller is located slightly off-center from the casing of the liquid-ring pump, such that the eccentricity between the impeller's axis of rotation and the geometric axis of the casing results in a cyclic variation of the volume enclosed by the vanes of the impeller and by the liquid ring. This is used to pump gas (typically air) through the pump; gas is drawn into the pump through an inlet port on one end of the casing, trapped in the compression chambers, reduced in volume by the impeller rotation, and discharged at the other end of the casing.

In current overhung impeller designs for liquid-ring pumps, the radial bearing is located outside of the compressor casing and at some distance from the impeller. Essentially, this means that the most significant portion of the weight of the impeller is cantilevered at some distance away from its point of support. The weight of the impeller being cantilevered this far away from its point of support produces a moment in the shaft, located between the radial bearing and the thrust bearings. This induced moment can be seen in the depiction of a prior art overhung impeller design, shown in exemplary FIG. 1. In current designs, this moment creates a radial load on the thrust bearings, which can lead to premature failure of the thrust bearings.

To further describe the current impeller designs, the impeller is typically attached to the shaft via collar and key, and with an impeller nut. The shaft is typically attached to the center of the impeller. The impeller, as shown, is significantly larger in diameter than the shaft.

During operation, the compressor operates with a certain amount of water inside the casing. When the impeller is active, this water is spun against the side of the casing. However, when the impeller is inactive or idle, this water sits in the bottom of the compressor casing. When the impeller is started from an inactive state, the impeller must turn through the water at the bottom of the compressor casing in order to properly dispose it around the inside of the casing of the compressor. This water creates a significant amount of drag on the impeller.

However, in a startup state, the top of the impeller is surrounded by gas or vapor, which has significantly less viscosity than the water at the bottom of the impeller. This means that there is far less drag on the top of the impeller as compared to the bottom of the impeller. Likewise, the gas at the top of the impeller has far less mass than the water at the bottom of the impeller, and therefore the gas has much less inertia resisting the movement of the impeller than the water. These two factors, combined with the radial bearing to impeller distance, means that the difference in the inertial forces on the impeller that may be required at startup may cause the impeller to "wobble" inside the casing until the impeller reaches a sufficient speed to create the necessary centrifugal motion to distribute the water throughout the casing.

Similar problems may arise when the impeller is to be shut down, though in reverse in this case. As the impeller slows, it will slow past the point at which it can create the necessary centrifugal motion to distribute the water throughout the casing, and the water will increasingly sink to the bottom of the casing. This may cause the bottom portion of the impeller to be slowed more quickly by the inertial force of the water acting on the impeller vanes, again causing wobble in the impeller.

In typical pump designs, the clearance between the impeller and the inside of the casing (specifically, between the impeller and the gas distributor located inside the casing) are very small, often on the order of 0.02". This means that, when the impeller is started up or shut down and cause to wobble, there is a potential for impact between the impeller and the gas distributor, which can typically damage the distributor, the impeller, or both.

Further, common pump designs as understood in the prior art are often expensive to fabricate and operate. A bearing arrangement for a current liquid ring pump requires that the bearing housing be fabricated and installed on the compressor. It also requires that this bearing be supplemented with an external bearing lubrication method, such as grease, oil, or oil mist, which requires monitoring and periodic refilling, and limits the placement of liquid ring pumps to points where they can be easily accessed for this required maintenance.

SUMMARY

According to an exemplary embodiment, a liquid ring compressor may be provided. The liquid ring compressor may have an overhung impeller disposed on an end of an impeller shaft. A radial bearing may be disposed on the shaft side of the impeller and a forward thrust bearing may be disposed between the impeller and an inlet gas head. The forward thrust bearing rotor may be mounted to a forward face of the overhung impeller and the forward thrust bearing stator may be mounted to at least one of an inlet gas head surface or compressor casing.

According to another exemplary embodiment, a bearing arrangement for a liquid ring compressor may include an overhung impeller disposed on an end of an impeller shaft. The overhung impeller may have a bearing track disposed around its circumference. Furthermore, at least one radial bearing secured within the compressor by a bearing support may rotate along the bearing track, securing the impeller.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
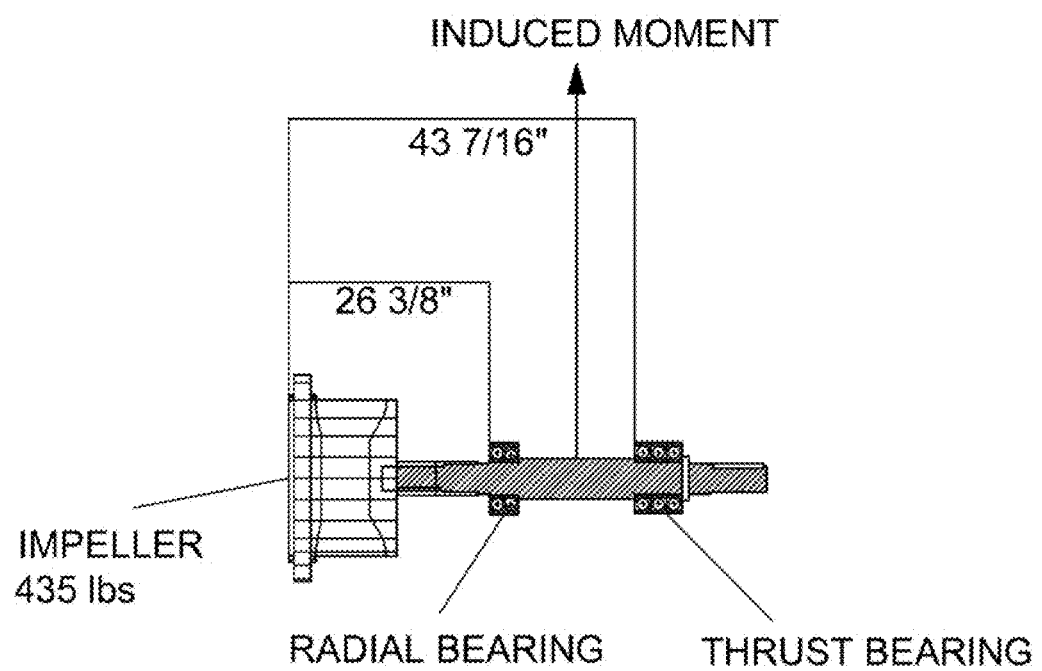
FIG. 1 is an exemplary embodiment of a liquid ring compressor with an overhung impeller, as understood in the prior art.

FIG. 1 depicts an exemplary embodiment of a prior art construction of an impeller-type liquid ring compressor.

Referring generally to the Figures, various exemplary implementations of an impeller-type liquid ring compressor may be disclosed. According to an exemplary embodiment, an impeller-type liquid ring compressor having an alternative bearing configuration and placement may be disclosed. Such a bearing arrangement may completely support the impeller as it rotates, eliminating many of the problems inherent in the prior art designs without changing the general overhung impeller design. This may allow the impeller-type liquid ring compressor to be easily retrofitted in existing use environments, such as, for example, oil and gas processing facilities, oil refineries, and petrochemical processing facilities. In an exemplary embodiment, an impeller-type liquid ring compressor may be suitable for use in, for example, flare gas recovery, chlorine gas compression, wastewater treatment (i.e. in the oxygenation process), vacuum distillation, or any other suitable use.

Figure 2:
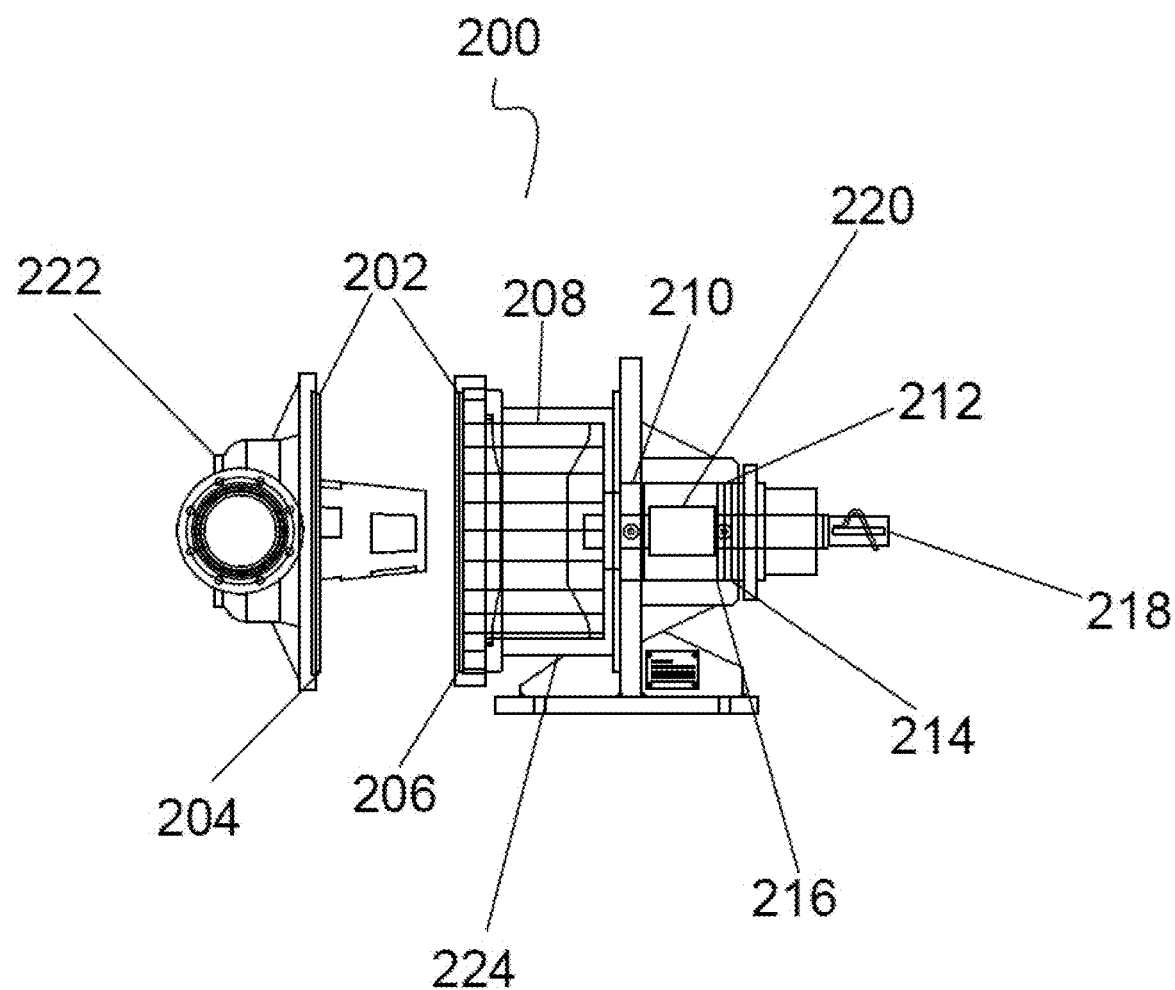
FIG. 2 is an exemplary embodiment of an impeller-type liquid ring compressor.

Turning now to exemplary FIG. 2, FIG. 2 displays an exemplary embodiment of an impeller-type liquid ring compressor 200 having an alternative bearing configuration. Such an alternative bearing configuration may offer various advantages over the prior art. The bearing arrangement may support the impeller in an overhung impeller style liquid ring compressor; however, it is contemplated the present thrust bearing arrangement may be used in a through-shaft impeller embodiment, if desired. A thrust bearing may be mounted directly on the impeller and the thrust bearing stator may be mounted on the inlet gas head surface or the compressor casing. The thrust bearing may therefore provide continuous support through the entire revolution of the impeller, eliminating potential vibrations induced from water slugs entering the machine and/or "wobble" at start-up and shut down.

In the exemplary embodiment shown in FIG. 2, a thrust bearing 202 may be provided between the impeller 208 and the compressor inlet head 222 of a liquid ring pump, which may be located on the opposite side of the thrust bearing 202 from the impeller 208. The thrust bearing 202 may include a thrust bearing stator 204 connectable on a first side of the thrust bearing 202 and a thrust bearing rotor 206 connectable on a second side of the thrust bearing 202. Thrust bearing stator 204 may be mounted on the inlet gas head 222 and the thrust bearing rotor 206 may be mounted directly on the impeller 208. This may provide continuous support through the entire revolution of the impeller, eliminating possible wobble and vibrations at start-up and shut down. In some further exemplary embodiments, the bearing stator 204 may be mounted to the compressor casing 224 or a combination of the inlet head 222 and the compressor casing 224. The compressor inlet head 222 and compressor casing 224 may optionally coincide or be integrally formed.

The impeller 208 may further have a radial bearing 210 disposed on the shaft side of the impeller 208 from the thrust bearing 202. In an exemplary embodiment, the inner race of the radial bearing 210 may be placed very near to the impeller 208 and or may even be connected to the impeller 208 on the shaft side of the impeller 208. In another exemplary embodiment, the inner race of the radial bearing 210 may be connected only to the impeller shaft 218 at a point near to the impeller 208.

In an exemplary embodiment, the impeller shaft 218 extending from the impeller 208 on a shaft side may be provided with a second thrust bearing 212, which may have a stator end 214 and a rotor end 216. In an exemplary embodiment, the stator end 214 may be coupled to the impeller shaft 218; for example, the stator end 214 may be coupled to a larger-diameter portion 220 of a multiple diameter impeller shaft 218, may be secured in place with a split collar, or may otherwise be disposed on the impeller shaft 218.

Such a thrust bearing arrangement may provide continuous support to the impeller 208 throughout the entire revolution of the impeller 208. This may thus reduce or eliminate any vibrations that may be caused by water slugs entering into the impeller 208, and may also reduce or eliminate any "wobble" of the impeller 208 at startup and at shut-down.

In an exemplary embodiment, the forward thrust bearing 202 may be a bearing that works well in a water-flooded condition. According to an exemplary embodiment, such a bearing may be a poly-crystalline diamond bearing, or PCD bearing. PCD is diamond grit that has been fused together under high-pressure, high-temperature conditions in the presence of a catalytic metal; such material may demonstrate extreme hardness, wear resistance, and thermal conductivity. In another exemplary embodiment, another type of thrust bearing 202 may be chosen that offers similar performance characteristics to a PCD bearing.

In an exemplary embodiment, the bearing 202 may not require lubrication and may require only a small flow of liquid through the bearing 202 during use in order to conduct heat, generated by the friction of the rotating surfaces, away from the bearing. In an exemplary embodiment, this liquid may be the process fluid, which may, for example, be water (for example, sour process water) or may be another fluid, such as crude oil, as desired. In another exemplary embodiment, the process fluid may provide some measure of lubrication to the bearing, in addition to conducting heat away from the bearing, as desired; this may ensure that a bearing requiring or benefiting from lubrication can be lubricated without the need for an external lubrication source.

In an exemplary embodiment, the remaining bearings, such as the radial bearing 210 and the second thrust bearing 212, may be constructed from similar materials; for example, in an exemplary embodiment, one or both of the radial bearing 210 and the second thrust bearing 212 may be PCD bearings. Alternatively, another bearing type having similar characteristics may be selected for the radial bearing 210 or the second thrust bearing 212.

According to an exemplary embodiment, the bearing configuration of the impeller-type liquid ring compressor may allow the shaft bearings, including the radial bearing 210 and the second thrust bearing 212, to be brought inside of the compressor casing, such that the radial bearing 210 may be provided adjacent to the impeller 208 and such that the thrust bearing 212 may be provided adjacent to the radial bearing 210. In an embodiment, this may shorten the required length of the shaft 218, and reduce the moment that may be induced between the bearings 210, 212. This may in turn reduce the potential for premature bearing failure caused by radial loads being imposed on the thrust bearings, such as thrust bearing 212 and thrust bearing 202. Such a configuration may also reduce the need for an external bearing housing, and the need for an external lubrication source, as desired. In some embodiments, the footprint of the compressor 200 may be reduced based on the shortened requirements for the length of the shaft 218, permitting the compressor 200 to be used in tighter conditions than had previously been the case.

Figure 3A:
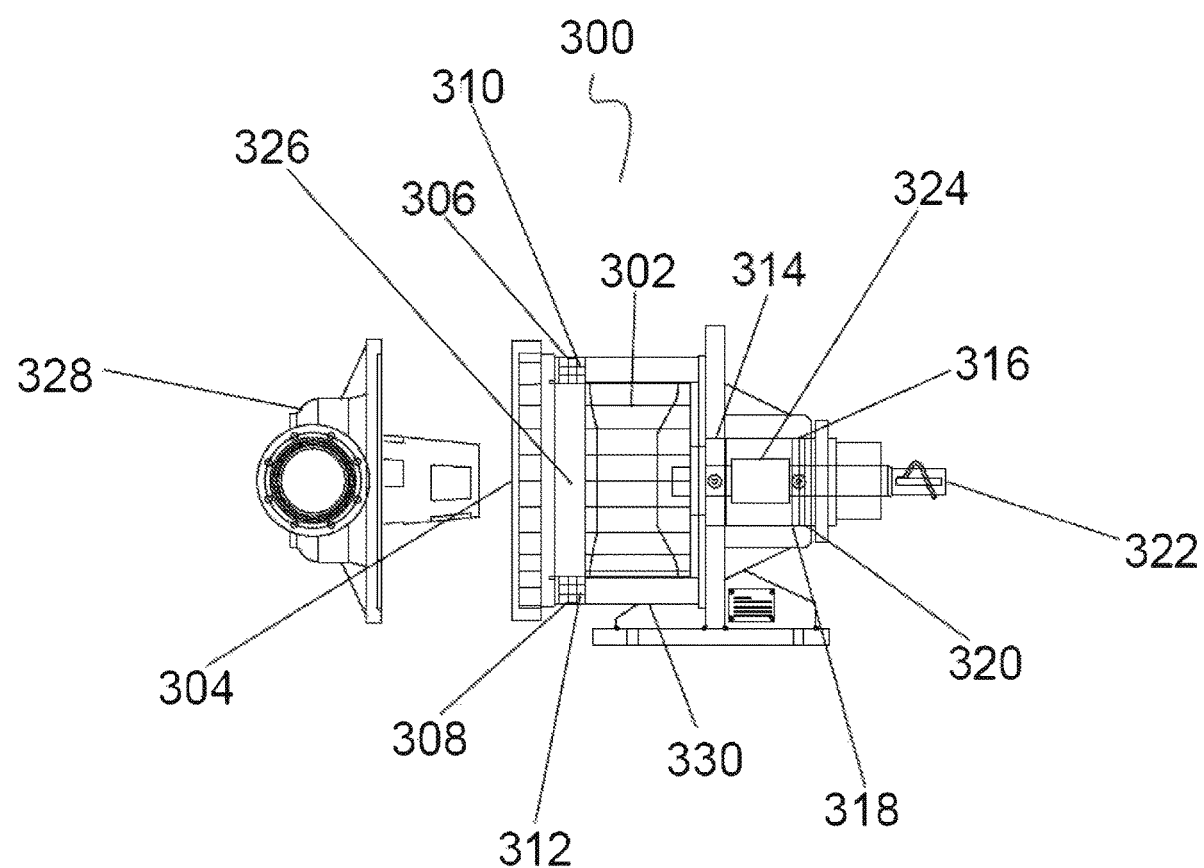
FIG. 3A is an exemplary embodiment of an impeller-type liquid ring compressor.
Figure 3B:
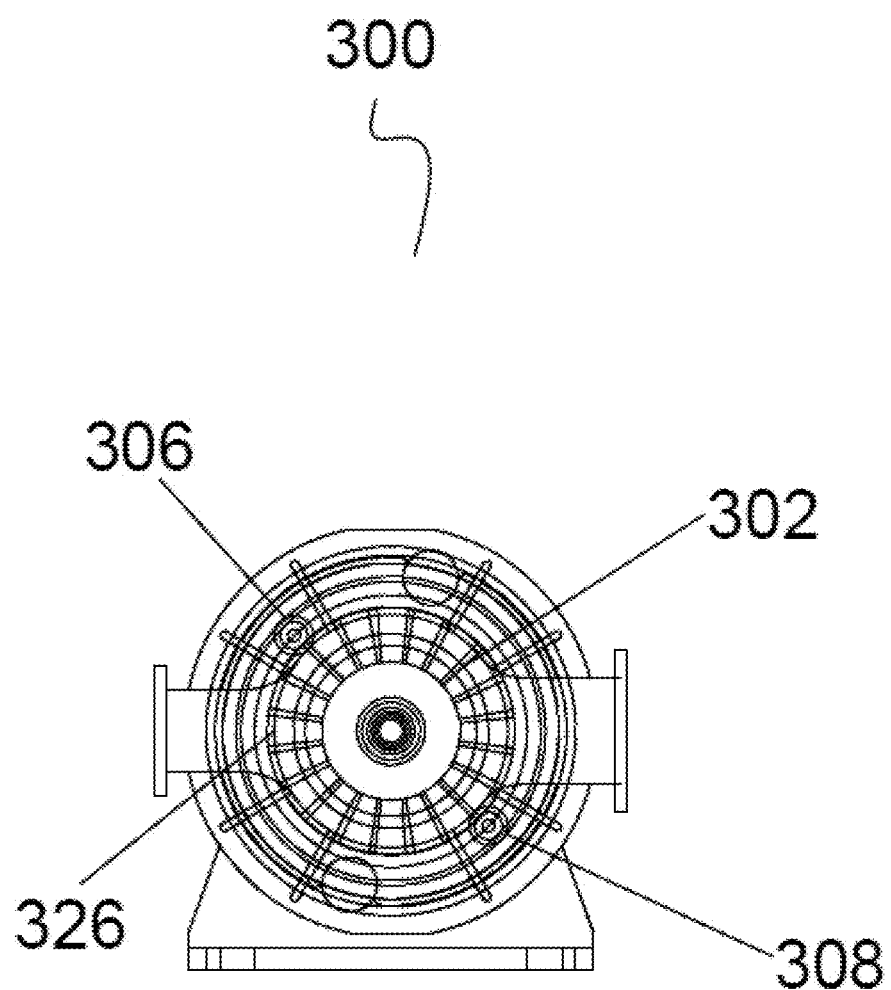
FIG. 3B is a front view of an exemplary embodiment of an impeller-type liquid ring compressor.

Turning now to exemplary FIGS. 3A and 3B, an alternative exemplary embodiment of an impeller-type liquid ring compressor 300 may be shown. According to an exemplary embodiment, rather than having a thrust bearing disposed on the face 304 of the impeller 302 (or in addition to having a thrust bearing disposed on the face 304 of the impeller 302 and adjacent to the compressor inlet head 328), the impeller 302 may be held in place by one or more radial bearings 306, 308, which may in turn be held in place by bearing supports 310, 312. Bearing supports 310, 312 may be affixed to a compressor casing 330. In an exemplary embodiment, these radial bearings 306, 308 may be configured to rotate on a bearing track 326 of the impeller 302, which may be a flattened portion of the impeller 302 free of impeller vanes, which may extend around the circumference of the impeller 302. In an exemplary embodiment, the bearing track 326 of the impeller 302 may be raised from the surface of the impeller 302 or may be disposed on the surface of the impeller 302. Exemplary FIG. 3B may show this in further detail. In some embodiments, the compressor inlet head 328 and compressor casing 330 may optionally coincide or be integrally formed.

Referring again to exemplary FIG. 3A, an impeller 302 may have a radial bearing 314 and a thrust bearing 316 having a stator end 320 and a rotor end 318, each of which may be disposed on a shaft 322. In an exemplary embodiment, a stator end 320 may be coupled to a shaft 322 at, for example, a thicker portion 324 of a multiple-diameter shaft 322. In an exemplary embodiment, bearings may likewise be PCD bearings, or may be another type of bearing, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A liquid ring compressor comprising:
   an overhung impeller disposed on an end of an impeller shaft;
   a radial bearing disposed on the shaft side of the impeller; and
   a forward thrust bearing supporting the impeller and formed between the impeller and an inlet gas head, wherein a forward thrust bearing rotor is mounted directly to or integrally formed with a forward face of the overhung impeller and a forward thrust bearing stator is mounted directly to or integrally formed with at least one of an inlet gas head surface or compressor casing.

2. The liquid ring compressor of claim 1, wherein an inner race of the radial bearing is connected to the impeller shaft.

3. The liquid ring compressor of claim 1, wherein an inner race of the radial bearing is connected to the impeller.

4. The liquid ring compressor of claim 1, wherein the forward thrust bearing is a poly-crystalline diamond bearing.

5. The liquid ring compressor of claim 1, further comprising a shaft thrust bearing disposed on the impeller shaft, wherein the shaft thrust bearing has a stator end and a rotor end, the stator end being secured to the impeller shaft.

6. The liquid ring compressor of claim 5, wherein the radial bearing, shaft thrust bearing, and forward thrust bearing are disposed within a compressor casing.

7. The liquid ring compressor of claim 1, wherein the forward thrust bearing requires no lubrication.

8. The liquid ring compressor of claim 1, wherein the forward thrust bearing uses only process fluid for at least one of lubrication and dissipating heat, and wherein the process fluid is only from within the compressor casing.

9. A bearing arrangement for a liquid ring compressor comprising:
   an overhung impeller disposed on an end of an impeller shaft, wherein the overhung impeller has a bearing track disposed around the circumference of the impeller;
   at least one impeller radial bearing secured within the liquid ring compressor by a bearing support, wherein the at least one impeller radial bearing is configured to rotate along the bearing track, securing the impeller,
   an impeller shaft radial bearing disposed on the impeller shaft, and
   an impeller shaft thrust bearing disposed on the impeller shaft on a side of the impeller shaft radial bearing opposite from the overhung impeller.

10. The bearing arrangement of claim 9, further comprising an impeller shaft radial bearing.

11. The bearing arrangement of claim 9, further comprising an impeller shaft thrust bearing.

12. The bearing arrangement of claim 9, further comprising a forward thrust bearing supporting the overhung impeller and formed between the impeller and an inlet gas head, wherein a forward thrust bearing rotor is mounted directly to or integrally formed with a forward face of the overhung impeller and a forward thrust bearing stator is configured to mount to an inlet gas head.

13. The bearing arrangement of claim 9, wherein the bearing track is connected to vanes of the impeller.

14. The bearing arrangement of claim 9, wherein the at least one impeller radial bearing is a poly-crystalline diamond bearing.

* * * * *